US012650719B2

(12) United States Patent
Cai

(10) Patent No.: US 12,650,719 B2
(45) Date of Patent: Jun. 9, 2026

(54) COMPUTING POWER DISTRIBUTION METHOD AND APPARATUS, AND COMPUTING POWER SERVER

(71) Applicants: YANGTZE DELTA INDUSTRIAL INNOVATION CENTER OF QUANTUM SCIENCE AND TECHNOLOGY, Suzhou (CN); TIANGONG QUANTUM INFORMATION (SUZHOU) TECHNOLOGY DEVELOPMENT CO., LTD., Suzhou (CN)

(72) Inventor: Jian Cai, Suzhou (CN)

(73) Assignees: YANGTZE DELTA INDUSTRIAL INNOVATION CENTER OF QUANTUM SCIENCE AND TECHNOLOGY, Suzhou (CN); TIANGONG QUANTUM INFORMATION (SUZHOU) TECHNOLOGY DEVELOPMENT CO., LTD., Suzhou (CN)

( * ) Notice: Subject to any disclaimer, the term of this patent is extended or adjusted under 35 U.S.C. 154(b) by 95 days.

(21) Appl. No.: 18/641,479

(22) Filed: Apr. 22, 2024

(65) Prior Publication Data

US 2024/0264647 A1     Aug. 8, 2024

Related U.S. Application Data

(63) Continuation of application No. PCT/CN2022/124604, filed on Oct. 11, 2022.

(30) Foreign Application Priority Data

Oct. 22, 2021     (CN) ......................... 202111234287.0

(51) Int. Cl.
*G06F 1/26* (2006.01)
*G06F 1/28* (2006.01)
(Continued)

(52) U.S. Cl.
CPC ..................................... *G06F 1/26* (2013.01)

(58) Field of Classification Search
CPC G06F 9/50; G06F 1/3203; G06F 1/26; G06N 10/00
See application file for complete search history.

(56) References Cited

U.S. PATENT DOCUMENTS

2022/0358390 A1* 11/2022 Ruedinger ................ G06F 8/41
2025/0115270 A1* 4/2025 Orbay .................... G06N 20/00

FOREIGN PATENT DOCUMENTS

CN     110428055 A     11/2019
CN     111949394 Y     11/2020
(Continued)

*Primary Examiner* — Jaweed A Abbaszadeh
*Assistant Examiner* — Gayathri Sampath
(74) *Attorney, Agent, or Firm* — Jose Cherson Weissbrot

(57) ABSTRACT

A computing power distribution method and apparatus, and a computing power server. The method includes: performing computational problem planning processing on a computational problem to obtain at least one sub-computational problem corresponding to the computational problem and a target algorithm type and computing mode corresponding to each sub-computational problem; according to the at least one sub-computational problem corresponding to the computational problem and the target algorithm type and computing mode corresponding to each sub-computational problem, determining at least one computational problem computing task corresponding to each sub-computational problem; according to dynamic computing power information of computing nodes and computing power calling relationships, determining at least one target node for each computational problem computing task; sending a comput- (Continued)

ing power control command to the target nodes; and receiving computing results returned by the target nodes, and send the computing results to an application node.

6 Claims, 7 Drawing Sheets

(51) Int. Cl.
G06F 1/3203 (2019.01)
G06F 1/329 (2019.01)
G06F 9/50 (2006.01)
G06N 10/00 (2022.01)

(56) References Cited

FOREIGN PATENT DOCUMENTS

| | | | |
|---|---|---|---|
| CN | 112465146 | Y | 3/2021 |
| CN | 112819170 | A | 5/2021 |
| CN | 112862104 | A | 5/2021 |
| CN | 113419833 | A | 9/2021 |
| CN | 114048857 | | 2/2022 |
| JP | 2021099860 | A | 7/2021 |
| WO | 2021072221 | A | 4/2021 |
| WO | 2021165639 | A | 8/2021 |

* cited by examiner

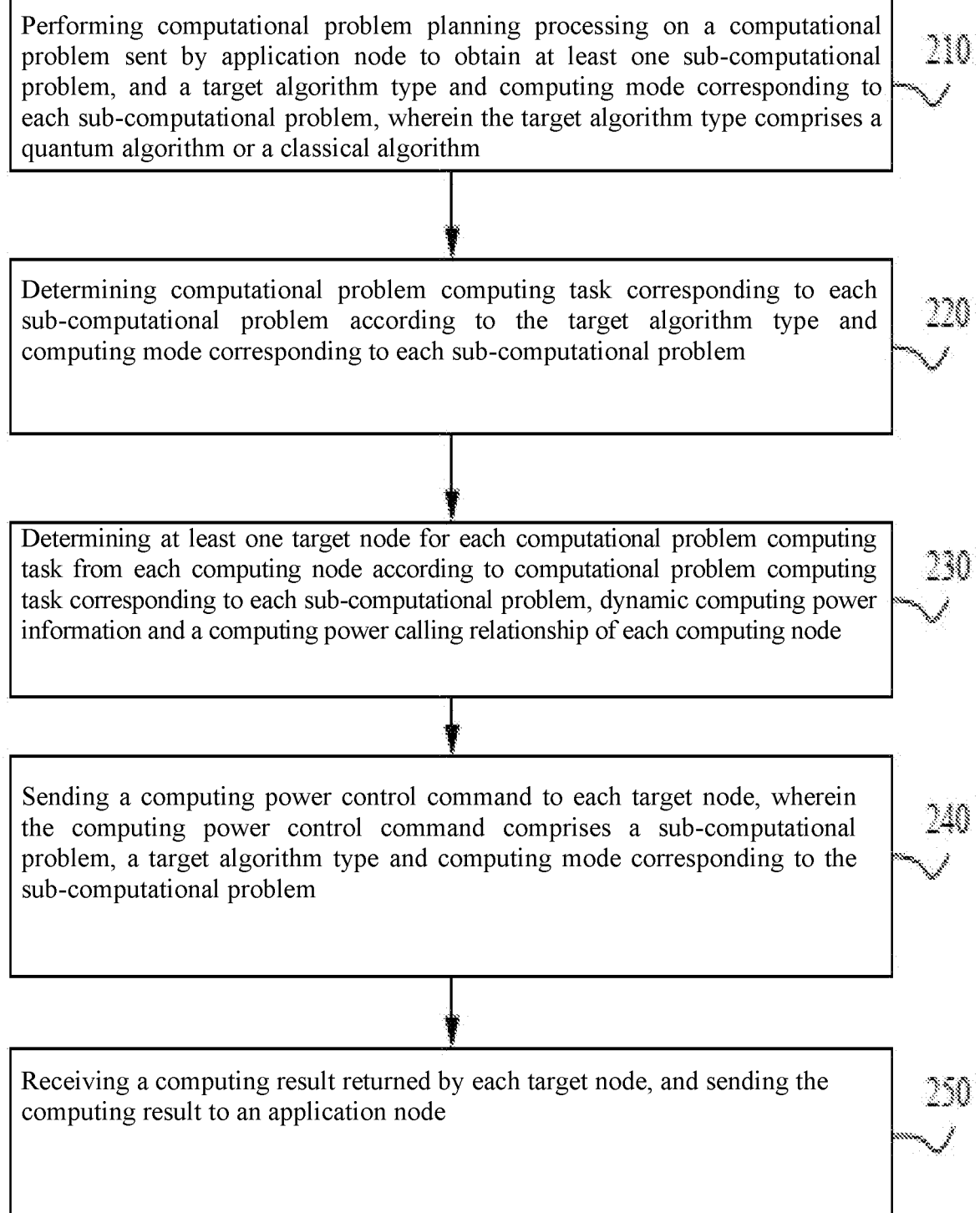

Performing computational problem planning processing on a computational problem sent by application node to obtain at least one sub-computational problem, and a target algorithm type and computing mode corresponding to each sub-computational problem, wherein the target algorithm type comprises a quantum algorithm or a classical algorithm ~ 210

Determining computational problem computing task corresponding to each sub-computational problem according to the target algorithm type and computing mode corresponding to each sub-computational problem ~ 220

Determining at least one target node for each computational problem computing task from each computing node according to computational problem computing task corresponding to each sub-computational problem, dynamic computing power information and a computing power calling relationship of each computing node ~ 230

Sending a computing power control command to each target node, wherein the computing power control command comprises a sub-computational problem, a target algorithm type and computing mode corresponding to the sub-computational problem ~ 240

Receiving a computing result returned by each target node, and sending the computing result to an application node ~ 250

FIG. 2

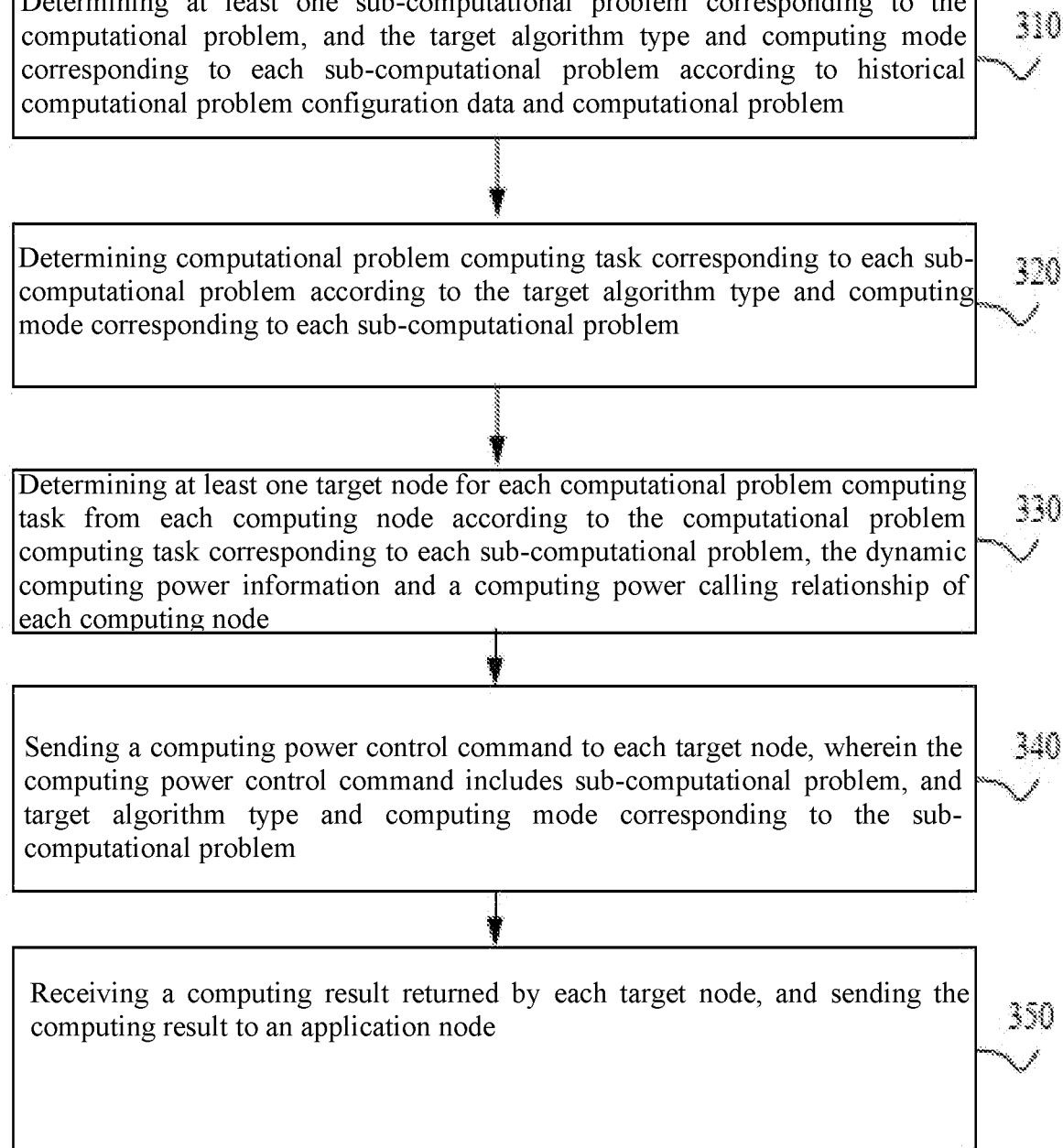

Determining at least one sub-computational problem corresponding to the computational problem, and the target algorithm type and computing mode corresponding to each sub-computational problem according to historical computational problem configuration data and computational problem        310

Determining computational problem computing task corresponding to each sub-computational problem according to the target algorithm type and computing mode corresponding to each sub-computational problem        320

Determining at least one target node for each computational problem computing task from each computing node according to the computational problem computing task corresponding to each sub-computational problem, the dynamic computing power information and a computing power calling relationship of each computing node        330

Sending a computing power control command to each target node, wherein the computing power control command includes sub-computational problem, and target algorithm type and computing mode corresponding to the sub-computational problem        340

Receiving a computing result returned by each target node, and sending the computing result to an application node        350

FIG. 3

Computing power server 700

Computing power service hardware device A

Computing power service hardware device B

COMPUTING POWER DISTRIBUTION METHOD AND APPARATUS, AND COMPUTING POWER SERVER

TECHNICAL FIELD

The present disclosure relates to the technical field of quantum computing, and particularly, to a computing power distribution method and apparatus, and a computing power server.

BACKGROUND

Quantum computer refers to a physical device that follows the laws of quantum mechanics to carry out high-speed mathematical and logical operations, store and process quantum information. The main characteristics of quantum computer are fast operation speed, strong ability of processing information, wide application range, etc.

In the related technologies, a quantum computer is generally mounted in an electronic computer as a specific algorithm device, and management and operation of the computational process of a quantum computer is realized by means of the electronic computer. However, the related technologies need to rely on a large number of manual tests and algorithm debugging work, which results in low management and operation efficiency of quantum computers.

SUMMARY

The present disclosure provides a computing power distribution method and apparatus, and a computing power server, so as to solve the defect of low management and operation efficiency of quantum computers in the prior art and improve the management and operation efficiency of quantum computers.

The invention provides a computing power distribution method for a computing power server which comprises at least one computing node which comprises a quantum computer and/or an electronic computer. The method comprises:

performing computational problem planning processing on a computational problem sent by application node to obtain at least one sub-computational problem, and a target algorithm type and computing mode corresponding to each sub-computational problem, wherein the target algorithm type comprises a quantum algorithm or a classical algorithm;

determining computational problem computing task corresponding to each sub-computational problem according to the target algorithm type and computing mode corresponding to each sub-computational problem;

determining at least one target node for each computational problem computing task from each computing node according to computational problem computing task corresponding to each sub-computational problem, dynamic computing power information and a computing power calling relationship of each computing node;

sending a computing power control command to each target node, wherein the computing power control command comprises the sub-computational problem, a target algorithm type and computing mode corresponding to the sub-computational problem; and receiving a computing result returned by each target node, and sending the computing result to an application node.

According to a computing power distribution method provided by the present disclosure, performing computational problem planning processing on a computational problem sent by application node to obtain at least one sub-computational problem, and a target algorithm type and computing mode corresponding to each sub-computational problem comprises:

determining at least one sub-computational problem corresponding to the computational problem, and the target algorithm type and computing mode corresponding to each sub-computational problem according to historical computational problem configuration data and the computational problem.

According to a computing power distribution method provided by the present disclosure, determining at least one sub-computational problem corresponding to the computational problem, and the target algorithm type and computing mode corresponding to each sub-computational problem according to historical computational problem configuration data and the computational problem comprises:

determining a computational problem configuration relationship according to the historical computational problem configuration data, wherein the operation problem configuration relationship is used for indicating at least one sub-computational problem corresponding to the computational problem and the target algorithm type and computing mode corresponding to each sub-computational problem; and determining at least one sub-computational problem corresponding to the computational problem, and the target algorithm type and computing mode corresponding to each sub-computational problem according to the computational problem configuration relationship and the computational problem.

According to a computing power distribution method provided by the present disclosure, determining at least one target node for each computational problem computing task from each computing nodes according to computational problem computing task corresponding to each sub-computational problem, dynamic computing power information and a computing power calling relationship of each computing node comprises:

determining a computing power quantization index threshold of each computational problem computing task; and determining at least one target node for each computational problem computing task from each computing node according to the computing power quantization index threshold of each computational problem computing task, dynamic computing power information and a computing power calling relationship of each computing node.

According to a computing power distribution method provided by the present disclosure, upon sending a computing power control command to each target node, the method further comprises:

receiving a dynamic computing power information and computational process returned by each target node; and adjusting each target node according to the dynamic computing power information and computational process.

The present disclosure further provides a computing power distribution apparatus, characterized in being applied to a computing power server. The computing power server comprises at least one computing node, and the computing node comprises a quantum computer and/or an electronic computer. The apparatus comprises:

a first processing module for performing computational problem planning processing on a computational problem sent by application node to obtain at least one sub-computational problem, and a target algorithm type and computing mode corresponding to each sub-computational problem, wherein the target algorithm type comprises a quantum algorithm or a classical algorithm;

a first determining module for determining computational problem computing task corresponding to each sub-computational problem according to the target algorithm type and computing mode corresponding to each sub-computational problem;

a second determining module for determining at least one target node for each computational problem computing task from each computing node according to computational problem computing task corresponding to each sub-computational problem, dynamic computing power information and a computing power calling relationship of each computing node;

a sending module for sending a computing power control command to each target node, wherein the computing power control command comprises the sub-computational problem, a target algorithm type and computing mode corresponding to the sub-computational problem;

a second processing module for receiving a computing result returned by each target node and sending the computing result to an application node.

According to a computing power distribution apparatus provided by the present disclosure, the first processing module is specifically used in:

determining at least one sub-computational problem corresponding to the computational problem, and the target algorithm type and computing mode corresponding to each sub-computational problem according to historical computational problem configuration data and the computational problem.

According to a computing power distribution apparatus provided by the present disclosure, the first processing module is specifically used in:

determining a computational problem configuration relationship according to the historical computational problem configuration data, wherein the operation problem configuration relationship is used for indicating at least one sub-computational problem corresponding to the computational problem and the target algorithm type and computing mode corresponding to each sub-computational problem; and determining at least one sub-computational problem corresponding to the computational problem, and the target algorithm type and computing mode corresponding to each sub-computational problem according to the computational problem configuration relationship and the computational problem.

According to a computing power distribution apparatus provided by the present disclosure, the second determining module is specifically used in:

determining a computing power quantization index threshold of each computational problem computing task; and determining at least one target node for each computational problem computing task from each computing node according to the computing power quantization index threshold of each computational problem computing task, dynamic computing power information and a computing power calling relationship of each computing node.

According to a computing power distribution apparatus provided by the present disclosure, the apparatus further comprises a third processing module for specific use in:

receiving a dynamic computing power information and computational process returned by each target node; and adjusting each target node according to the dynamic computing power information and computational process.

The present disclosure further provides an electronic device including a memory, a processor, and a computer program stored in the memory and executed on the processor. When the processor executes the program, the steps of any one of the above computing power distribution method are implemented.

The present disclosure further provides a computing power server, characterized by comprising at least one computing power service hardware device, said computing power service hardware device implements the steps of any one of the above computing power distribution methods; said computing power service hardware device is connected with at least one application node; said computing power service hardware device comprises a quantum state microwave control system interface and a digital computing power communication port connection, wherein the quantum state microwave control system interface is used for connecting at least one quantum computer; and the digital computing power communication port is used for connecting at least one electronic computer.

The present disclosure further provides a non-transitory computer readable storage medium having a computer program stored thereon. When the computer program is executed by the processor, the steps of any one of the above computing power distribution method are implemented.

The present disclosure further provides a computer program product comprising a computer program. When the computer program is executed by the processor, the steps of any one of the above computing power distribution method are implemented.

The invention provides a computing power distribution method and apparatus, and a computing power server. The method comprises: performing computational problem planning processing on a computational problem to obtain at least one sub-computational problem corresponding to the computational problem and a target algorithm type and computing mode corresponding to each sub-computational problem; according to the at least one sub-computational problem corresponding to the computational problem and the target algorithm type and computing mode corresponding to each sub-computational problem, determining at least one computational problem computing task corresponding to the computational problem; according to dynamic computing power information of computing nodes and computing power calling relationships, determining at least one target node for each computational problem computing task; sending a computing power control command to the target nodes; and receiving computing results returned by the target nodes, and sending the computing results to an application node. According to the method, an appropriate target node is distributed for each sub-computational problem to provide computing power, thereby making the distribution of computing power more reasonable, and also improving the management and operation efficiency of quantum computers and electronic computers in the process of distributing at least one target node corresponding to the computational problem, considering the target algorithm type and computing mode of the sub-computational problem corresponding to the computational problem.

BRIEF DESCRIPTION OF THE DRAWINGS

In order to more clearly explain the technical solutions in the present invention or the prior art, drawings required in the embodiments or the prior art will be briefly described below. Obviously, the drawings in the following description are some embodiments of the present invention. For those skilled in the art, other drawings may be obtained from these drawings without any creative effort.

FIG. 2 is a first flow diagram of a computing power distribution method provided by the present disclosure;

FIG. 3 is a second flow diagram of a computing power distribution method provided by the present disclosure;

DETAILED DESCRIPTION OF THE EMBODIMENTS

To make the purpose, technical solution, and advantages of the present disclosure clearer, the technical solutions of the present disclosure will be described clearly and completely as follows with reference to the drawings in the present disclosure. Obviously, the described embodiments are part of, but not all of, the embodiments of the present disclosure. Based on the embodiments of the present disclosure, all the other embodiments obtained by those skilled in the art without paying any creative work fall within the protection scope of the present disclosure.

Figure 1:
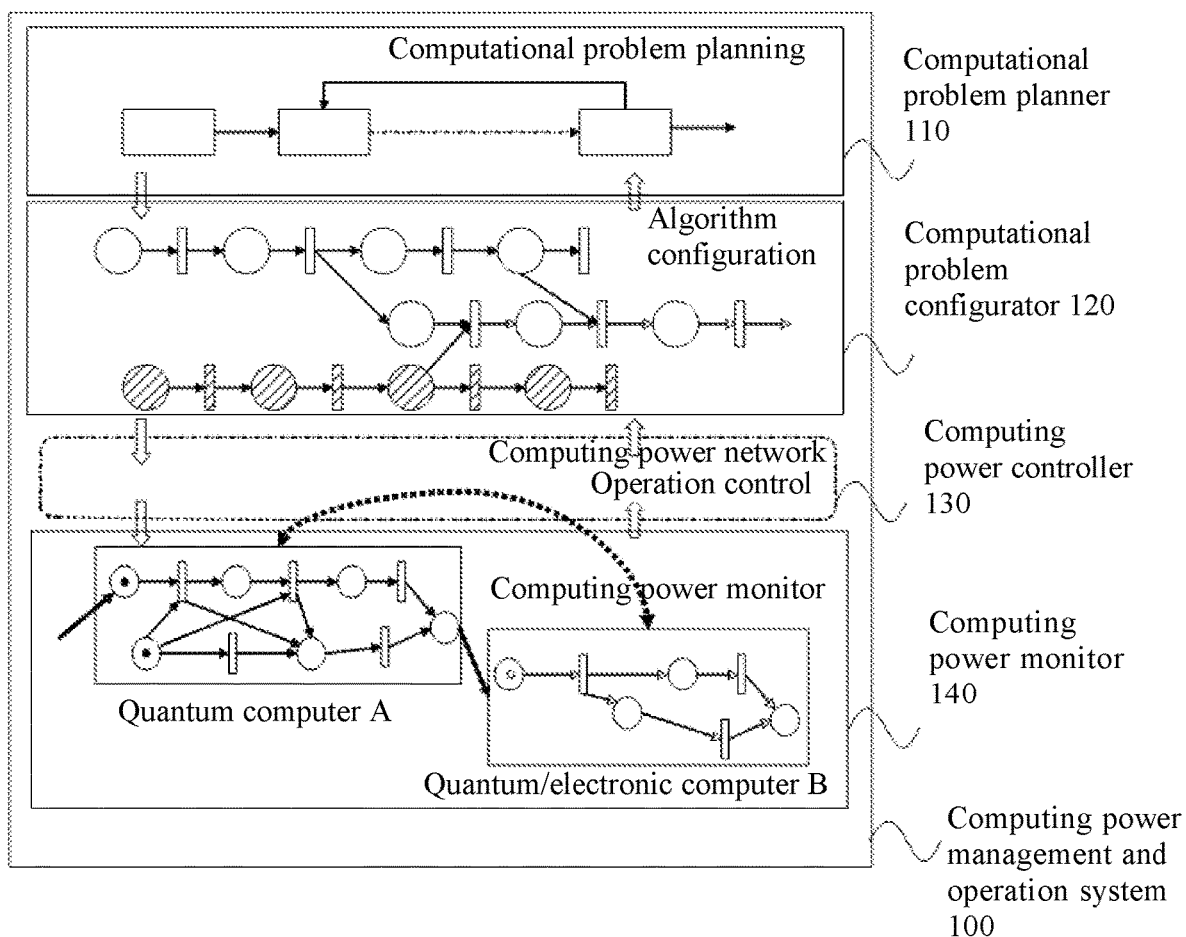
FIG. 1 is a schematic diagram of a computing power management and operation system provided by the present disclosure.

Next, the computing power management and operation system applied to the computing power distribution method provided by the present invention will be described with reference to FIG. 1. FIG. 1 is a schematic diagram of a computing power management and operation system provided by the present disclosure.

As shown in FIG. 1, the computing power management and operation system 100 includes a computational problem planner 110, a computational problem configurator 120, a computing power controller 130, and a computing power monitor 140. The computing power management and operation system mainly performs the following processing: collecting, storing and analyzing dynamic computing power information of a plurality of distributed quantum computers and electronic computers, establishing a computing power network connection model and a cooperative computing power model of a computer group consisting of a plurality of distributed quantum computers and electronic computers, to realize intelligent and automatic management and operation of the computing power of the plurality of quantum computers and electronic computers.

Wherein, the computing power network connection model comprises a mutual information network connection structure, a connected communication protocol and a connection mode among the computing nodes of a computer group consisting of a plurality of distributed quantum computers and electronic computers. The computing power network collects computing power information through the communication interface, and stores the matrix data in the computing power network information in a memory, a database or a quantum storage medium. The cooperative computing power model is a model of a manner, a checking method, an error correction method, a complex computing method and the like for a plurality of computers to cooperatively complete a computing task through mutual algorithm calling and information input and output on a computing power network. The cooperative computing power model collects and updates dynamic computing power information of a plurality of quantum computers and electronic computers at regular time through a computing power network, and stores the updated computing power information in a memory, a database or a quantum storage medium.

The computing power planner is used for decomposing the received computational problem into a plurality of sub-computational problems according to a system model or a computational problem recognition model, and determining algorithm type, computing step and computing mode for processing each sub-computational problem. The algorithm type comprises a quantum algorithm or a classical algorithm. The system model is an optimal algorithm configuration model which has stored the corresponding commonly used computational problems in the system. The computational problem recognition model is a model obtained by machine learning training according to the set data of computational problems and algorithms collected and stored by the system.

The algorithm configurator is used for calculating and obtaining an algorithm configuration solution capable of solving a computational problem according to the dynamic computing power information of each quantum computer and electronic computer and the mutual calling relationship corresponding to each dynamic computing power information.

The arithmetic operation controller is used for sending operation commands and calculating data to one or more quantum computers and/or electronic computers meeting the algorithm configuration solution, and sequencing the computing power operation tasks. Then, the operation commands of computing power task are sent to the corresponding quantum computer and/or electronic computer, and the feedback information such as computational process data and computational efficiency is obtained, wherein the operation information corresponding to the physical state type of the corresponding computer being controlled is sent according to the physical state type of the corresponding computer being controlled. For example, a quantum computer sends quantum microwave control information, and an electronic computer sends electronic system digital control information.

The computing power monitor is used for monitoring and judging the computing power state of the quantum computer and the computational process according to the feedback information. At the same time, the computing power monitor determines whether a quantum computer or electronic computer has made computational errors or provided the controlled computing power, updates based on the feedback information and sends control commands.

Through the quantum computing power management and operation system applied by the computing power distribution method provided by the present disclosure, the process of calculating the computing power provided by a plurality of quantum computers and/or electronic computers on a plurality of computational problems is realized, thereby solving the plurality of computational problems. At the same time, the effective management and operation of the computing power resources of the quantum computer and the electronic computer is achieved.

The computing power distribution method of the present invention will be described below with reference to FIGS. 2-4.

FIG. 2 is a first flow diagram of a computing power distribution method provided by the present disclosure. As shown in FIG. 2, the method comprises:

Step 210: performing computational problem planning processing on a computational problem sent by application node to obtain at least one sub-computational problem, and a target algorithm type and computing mode corresponding to each sub-computational problem, wherein the target algorithm type comprises a quantum algorithm or a classical algorithm.

Wherein, the executive subject in the computing power distribution method provided by the present disclosure is a computing power server.

In the embodiment, the application node is a terminal device for providing a computational problem, for example, a communication device such as a computer, a mobile phone, a tablet computer, which is not limited thereto. Moreover, the computational problem refers to the problem that requires a certain computing power to solve.

Optionally, the computing power server receives the computational problem sent by the application node, and performs computational problem planning processing on the computational problem according to the system model to obtain at least one sub-computational problem corresponding to the computational problem and a target algorithm type and computing mode corresponding to each sub-computational problem, wherein the target algorithm type comprises a quantum algorithm or a classical algorithm. It should be noted that the quantum algorithm refers to the algorithm that can only be used by a quantum computer, while the classical algorithm refers to the algorithm that can be used by an electronic computer. The system model is a corresponding optimal algorithm configuration model which has stored the commonly used computational problems in the computing power server. That is, the optimal algorithm configuration information corresponding to each commonly used computational problem is stored in the system model.

Optionally, the computing power server receives the computational problem sent by the application node, and performs computational problem planning processing on the computational problem according to the algorithm recognition model to obtain at least one sub-computational problem corresponding to the computational problem and a target algorithm type and computing mode corresponding to each sub-computational problem. The computational problem recognition model is a model obtained by machine learning training according to the set data of computational problems and algorithms collected and stored by the computing power server. That is, the computational problem is input to the computational problem recognition model, and the computational problem recognition model outputs the algorithm configuration information corresponding to the computational problem, that is, the algorithm configuration information corresponding to the algorithm is at least one sub-computational problem corresponding to the computational problem and a target algorithm type and computing mode corresponding to each sub-computational problem.

Step 220: determining computational problem computing task corresponding to each sub-computational problem according to the target algorithm type and computing mode corresponding to each sub-computational problem.

Based on the above step 210, at least one sub-computational problem corresponding to the computational problem and the target algorithm type and computing mode corresponding to each sub-computational problem are determined. Next, the computational problem computing task corresponding to each sub-computational problem will be determined.

Optionally, for any one of the computational problems, the sub-computational problem, the target algorithm type and computing mode corresponding to each sub-computational problem are determined as a computational problem computing task. It is conceivable that the computational problem computing task includes the sub-computational problem, the target algorithm type corresponding to the sub-computational problem, and the computational method for processing the sub-computational problem. It should be noted that the computing mode of the sub-computational problem is an algorithm for processing the sub-computational problem.

Step 230: determining at least one target node for each computational problem computing task from each computing node according to the computational problem computing task corresponding to each sub-computational problem, the dynamic computing power information and a computing power calling relationship of each computing node.

Wherein, a computing node refers to a device that can provide computing power. For example, it may be a quantum computer capable of providing quantum computing power, and an electronic computer capable of providing classical computing power. The dynamic computing power information of the computing node may include, for example, the type of the computing node, the type and property of the available algorithm operation, the processing computing amount per unit time for each type of operation, and the task scheduling processed by the computer in real time.

Considering that the computational problem computing tasks are interrelated, such as in series, in parallel, and coupling. A plurality of quantum computers or electronic computers are required to cooperate to complete a plurality of interrelated computational problem computing tasks when processing the computational problem computing tasks corresponding to the sub-computational problem. Accordingly, the mutual calling relationship corresponding to the dynamic computing power information of each computing node is denoted by using the computing power calling relationship, i.e., a computing power calling relationship in a plurality of quantum computers and/or electronic computers.

Optionally, a computing power quantization index threshold corresponding to each sub-computational problem is determined according to the computational problem computing task of each sub-computational problem, wherein the computing power quantization index may include computing processing time, computing speed, error rate, error correction times, computing energy consumption, etc. If the computing power quantization index is determined as a computing speed, the sub-computational problem has a computing speed threshold. Then, according to the dynamic computing power information of each computing node, the computing node in the dynamic computing power information with a computing speed greater than the computing speed threshold and with the maximum computing speed is determined as a target node corresponding to the subtask. At the same time, according to the computing power calling relationship, a computing node which has a computing power calling relationship with a target node corresponding to the subtask and has a computing speed greater than the computing speed threshold is determined as other target nodes corresponding to the subtask. Therefore, at least one target node corresponding to the subtask is obtained according to one target node corresponding to the subtask and other target nodes corresponding to the subtask.

Step 240: sending a computing power control command to each target node, wherein the computing power control command includes sub-computational problem, target algorithm type and computing mode corresponding to the sub-computational problem.

Based on the above step 230, at least one target node corresponding to each sub-computational problem is determined, and then, a computing power control command is sent to each target node. The computing power control command includes the sub-computational problem, the target algorithm type and computing mode corresponding to the sub-computational problem. The computing mode is used to indicate the algorithm to be used for processing the sub-computational problem.

It is conceivable that upon receiving the computing power control command by each target node, each target node processes the sub-computational problem in the computing power control command by adopting a computing mode (algorithm) in the computing power control command according to the computing power control command.

Step 250: receiving a computing result returned by each target node, and sending the computing result to an application node.

Based on the above step 240, upon sending the computing power control command to each target node, each target node processes its own computational problem computing task to obtain the computing result corresponding to the computational problem computing task, and each target node sends the computing result to the computing power server. The computing power server receives the computing result returned by each target node and sends the computing result to the corresponding application node.

The computing power distribution method provided by the present disclosure comprises: performing computational problem planning processing on a computational problem to obtain at least one sub-computational problem corresponding to the computational problem and a target algorithm type and computing mode corresponding to each sub-computational problem; according to the at least one sub-computational problem corresponding to the computational problem and the target algorithm type and computing mode corresponding to each sub-computational problem, determining at least one computational problem computing task corresponding to the computational problem; according to dynamic computing power information of computing nodes and computing power calling relationships, determining at least one target node for each computational problem computing task; sending a computing power control command to the target nodes; and receiving computing results returned by the target nodes, and sending the computing results to an application node. According to the method, an appropriate target node is distributed for each sub-computational problem to provide computing power, thereby making the distribution of computing power more reasonable, and also improving the management and operation efficiency of quantum computers and electronic computers in the process of distributing at least one target node corresponding to the computational problem, considering the target algorithm type and computing mode of the sub-computational problem corresponding to the computational problem.

Optionally, FIG. 3 is a second flow diagram of a computing power distribution method provided by the present disclosure. As shown in FIG. 3, the method comprises:

Step 310: determining at least one sub-computational problem corresponding to the computational problem, and the target algorithm type and computing mode corresponding to each sub-computational problem according to historical computational problem configuration data and computational problem.

Wherein, the historical computational problem configuration data comprises a common computational problem, and at least one sub-computational problem, and a target algorithm type and computing mode corresponding to corresponding to each sub-computational problem that correspond to each common computational problem. The relationship between the computational problem and the computational problem configuration information is determined according to the historical computational problem configuration data, i.e., a computational problem configuration relationship is determined.

Optionally, at least one sub-computational problem corresponding to the computational problem, and the target algorithm type and computing mode corresponding to each sub-computational problem are determined according to the historical computational problem configuration data and computational problem. Specifically, the computational problem from the application node is compared with the commonly used computational problem in the computational problem configuration relationship to find the associated computational problem related to the computational problem from the computational problem configuration relationship. The at least one sub-computational problem corresponding to the associated computational problem, and the target algorithm type and computing mode corresponding to each sub-computational problem are determined as at least one sub-computational problem corresponding to the computational problem and the target problem type and computing mode corresponding to each sub-computational problem.

Step 320: determining computational problem computing task corresponding to each sub-computational problem according to the target algorithm type and computing mode corresponding to each sub-computational problem.

Step 330: determining at least one target node for each computational problem computing task from each computing node according to the computational problem computing task corresponding to each sub-computational problem, the dynamic computing power information and a computing power calling relationship of each computing node.

Step 340: sending a computing power control command to each target node, wherein the computing power control command includes sub-computational problem, and target algorithm type and computing mode corresponding to the sub-computational problem.

Step 350: receiving a computing result returned by each target node, and sending the computing result to an application node.

Alternatively, the description and explanation of the steps 320-350 can be referred to the above description and explanation of the steps 220-250, respectively, and the same technical effect can be achieved. To avoid repetition, it will not be described in detail herein.

Figure 4:
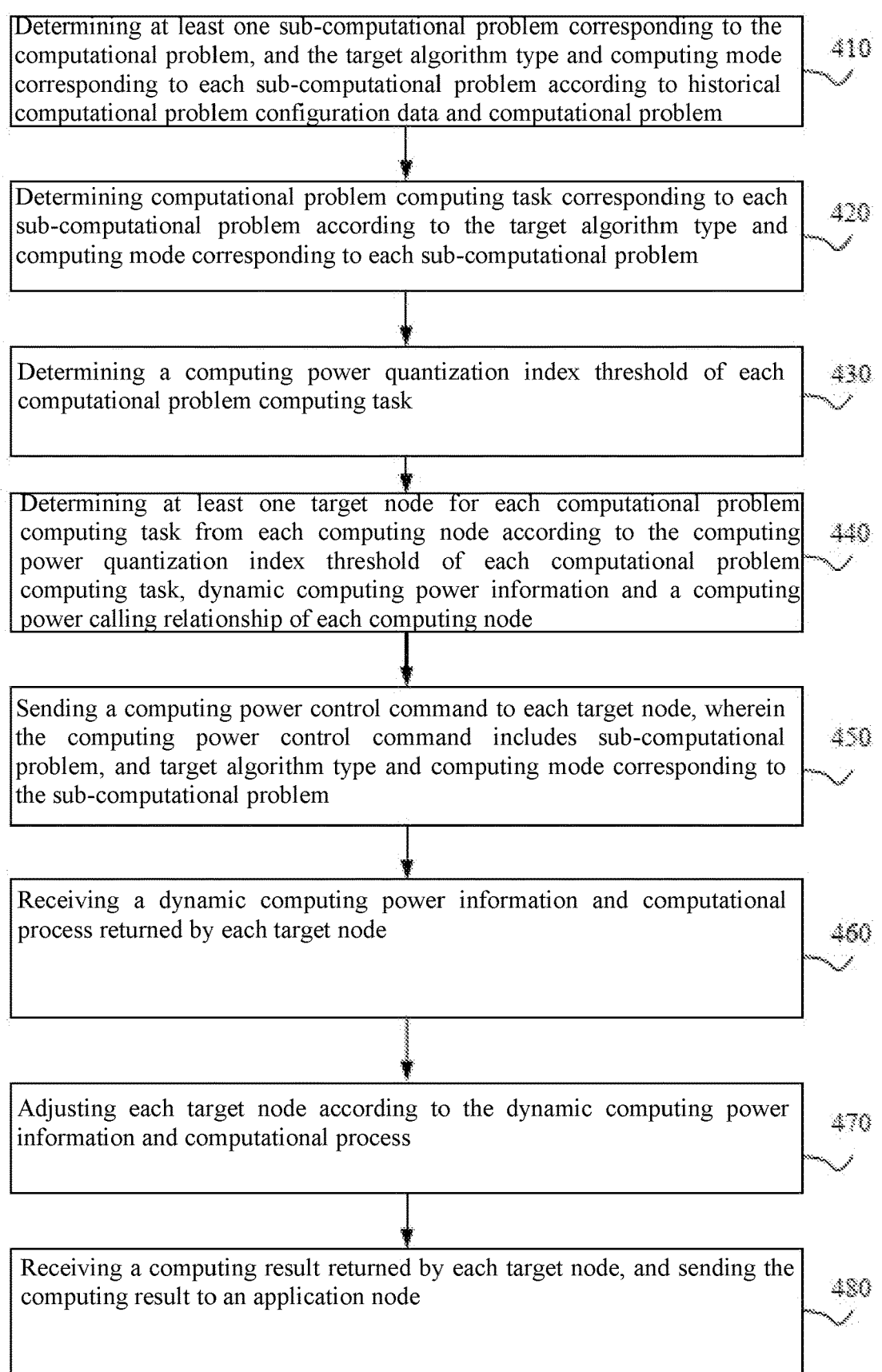
FIG. 4 is a third flow diagram of a computing power distribution method provided by the present disclosure.

Optionally, FIG. 4 is a third flow diagram of a computing power distribution method provided by the present disclosure. As shown in FIG. 4, the method comprises:

Step 410: determining at least one sub-computational problem corresponding to the computational problem, and the target algorithm type and computing mode corresponding to each sub-computational problem according to historical computational problem configuration data and computational problem.

Step 420: determining computational problem computing task corresponding to each sub-computational problem according to the target algorithm type and computing mode corresponding to each sub-computational problem.

Step 430: determining a computing power quantization index threshold of each computational problem computing task.

In this embodiment, the computing power quantization index corresponding to each computational problem computing task and the computing power quantization index threshold corresponding to each computational problem computing task are determined, wherein the computing power quantization index is a group of indexes corresponding to each computational problem, for example, computing processing time, error rate, error correction times, computing energy consumption.

In other words, the computing processing time threshold, error rate threshold, error correction times threshold, computing energy consumption, etc., corresponding to each computational problem computing task are determined.

Step 440: determining at least one target node for each computational problem computing task from each computing node according to the computing power quantization index threshold of each computational problem computing task, dynamic computing power information and a computing power calling relationship of each computing node.

Based on the above step 430, after determining the computing power quantization index threshold of each computational problem computing task, at least one target node for each computational problem computing task from each computing node is determined.

Optionally, the dynamic computing power information and the computing power calling relationship of each computing node are obtained. According to the dynamic computing power information and the computing power calling relationship of each computing node, a computing node satisfying each computing power quantization index (greater than or equal to the computing power quantization index threshold) of the computational problem computing task is selected from the computing nodes as a target node corresponding to the computational problem computing task. At the same time, the other target nodes corresponding to the computational problem computing task are determined according to one target node corresponding to the computational problem computing task and the computing power calling relationship among the computing nodes. In other words, at least one target node corresponding to the computational problem computing task is determined according to one target node corresponding to the computational problem computing task and other target nodes.

Step 450: sending a computing power control command to each target node, wherein the computing power control command includes sub-computational problem, and target algorithm type and computing mode corresponding to the sub-computational problem.

Step 460: receiving a dynamic computing power information and computational process returned by each target node.

Based on the above step 450, upon sending a computing power control command to each target node, each target node returns its own dynamic computing power information and computational process of the computational problem computing task calculated by each target node.

Optionally, the computing power server receives the dynamic computing power information and the computational process returned by each target node.

Step 470: adjusting each target node according to the dynamic computing power information and computational process.

Based on the above step 460, the computing power server receives the dynamic computing power information and computational process of each target node, and then the computing power server adjusts each target node according to the dynamic computing power information and computational process of each target node.

Optionally, the computing power server determines whether each computing node has a computational error or can provide the required computing power according to the dynamic computing power information and computational process of each target node. If a target node cannot provide the required computing power for the computational problem computing task or there is a computational error, the target node with error needs to be adjusted, and a new target node for the computational problem computing task is determined and a computing power control command is sent to the new target node, so that the new target node processes the computational problem computing task according to the received computing power control command.

Step 480: receiving a computing result returned by each target node, and sending the computing result to an application node.

Alternatively, the description and explanation of the steps 410, 420, 450, 480 can be referred to the above description and explanation of the steps 310, 220, 240, 250, respectively, and the same technical effect can be achieved. To avoid repetition, it will not be described in detail herein.

The computing power distribution apparatus provided by the present invention is described below, and the computing power distribution apparatus described below and the computing power distribution method described above can be referred to each other correspondingly.

Figure 5:
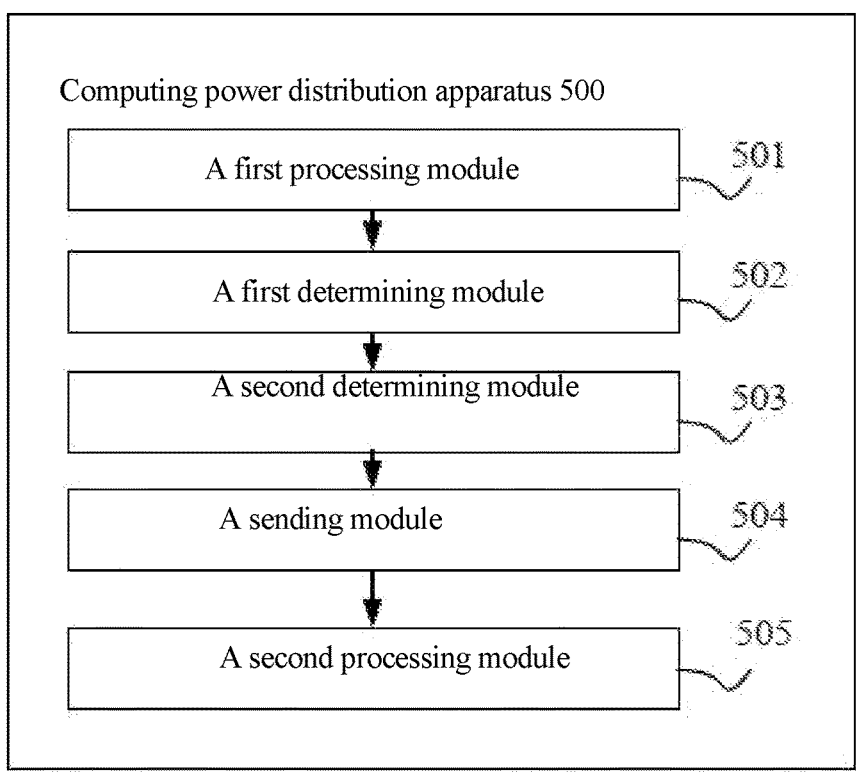
FIG. 5 is a first flow diagram of a computing power distribution apparatus provided by the present disclosure.

The present disclosure relates to a computing power distribution apparatus. FIG. 5 is a first flow diagram of a computing power distribution apparatus provided by the present disclosure. As shown in FIG. 5, the apparatus 500 comprises: a first processing module 501, a first determining module 502, a second determining module 503, a sending module 504, and a second processing module 505.

a first processing module 501 for performing computational problem planning processing on a computational problem sent by application node to obtain at least one sub-computational problem, and a target algorithm type and computing mode corresponding to each sub-computational problem, wherein the target algorithm type comprises a quantum algorithm or a classical algorithm;

a first determining module 502 for determining computational problem computing task corresponding to each sub-computational problem according to the target algorithm type and computing mode corresponding to each sub-computational problem;

a second determining module 503 for determining at least one target node for each computational problem computing task from each computing nodes according to computational problem computing task corresponding to each sub-computational problem, dynamic computing power information and a computing power calling relationship of each computing node;

a sending module 504 for sending a computing power control command to each target node, wherein the computing power control command comprises the sub-computational problem, a target algorithm type and computing mode corresponding to the sub-computational problem; and a second processing module 505 for receiving a computing result returned by each target node and sending the computing result to an application node.

According to a computing power distribution apparatus provided by the present disclosure, the first processing module is specifically used in determining at least one sub-computational problem corresponding to the computational problem, and the target algorithm type and computing mode corresponding to each sub-computational problem according to historical computational problem configuration data and the computational problem.

The computing power distribution apparatus provided by the present disclosure comprises: performing computational problem planning processing on a computational problem to obtain at least one sub-computational problem corresponding to the computational problem and a target algorithm type and computing mode corresponding to each sub-computational problem; according to the at least one sub-computational problem corresponding to the computational problem and the target algorithm type and computing mode corresponding to each sub-computational problem, determining at least one computational problem computing task corresponding to the computational problem; according to dynamic computing power information of computing nodes and computing power calling relationships, determining at least one target node for each computational problem computing task; sending a computing power control command to the target nodes; and receiving computing results returned by the target nodes, and sending the computing results to an application node. According to the method, an appropriate target node is distributed for each sub-computational problem to provide computing power, thereby making the distribution of computing power more reasonable, and also improving the management and operation efficiency of quantum computers and electronic computers in the process of distributing at least one target node corresponding to the computational problem, considering the target algorithm type and computing mode of the sub-computational problem corresponding to the computational problem.

Optionally, the first processing module is specifically used in:

determining a computational problem configuration relationship according to the historical computational problem configuration data, wherein the operation problem configuration relationship is used for indicating at least one sub-computational problem corresponding to the computational problem and the target algorithm type and computing mode corresponding to each sub-computational problem; and determining at least one sub-computational problem corresponding to the computational problem, and the target algorithm type and computing mode corresponding to each sub-computational problem according to the computational problem configuration relationship and the computational problem.

Optionally, the second determining module is specifically used in:

determining a computing power quantization index threshold of each computational problem computing task; and determining at least one target node for each computational problem computing task from each computing node according to the computing power quantization index threshold of each computational problem computing task, dynamic computing power information and a computing power calling relationship of each computing node.

Figure 6:
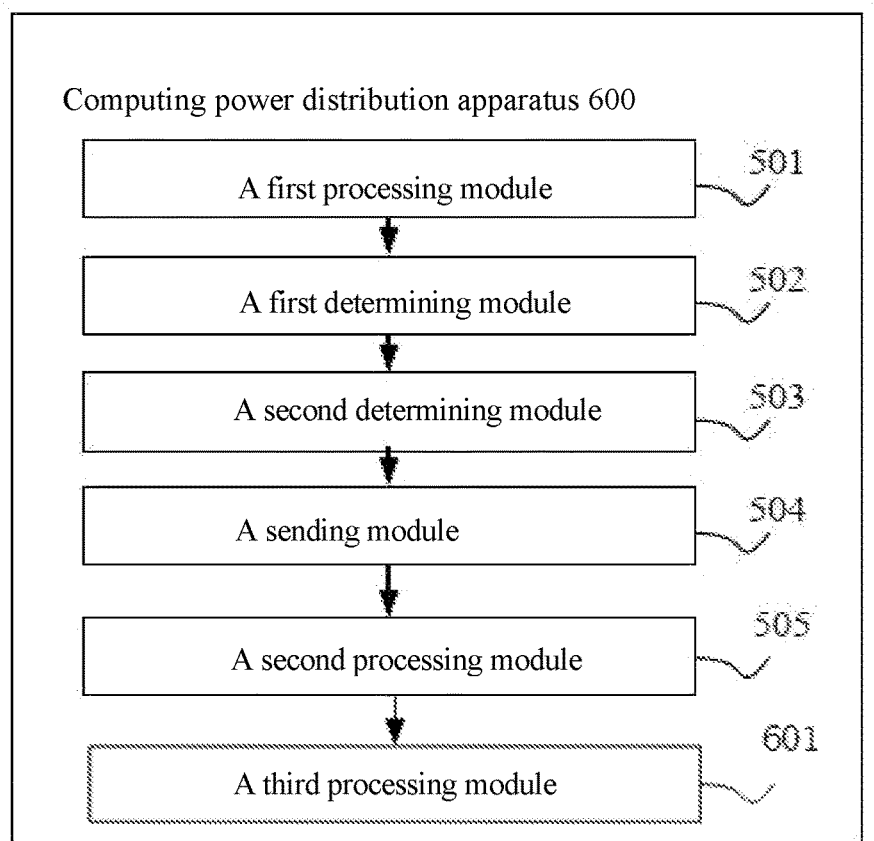
FIG. 6 is a second flow diagram of a computing power distribution apparatus provided by the present disclosure.

Optionally, FIG. 6 is a second flow diagram of a computing power distribution apparatus provided by the present disclosure. As shown in FIG. 6, the apparatus 600 comprises: a first processing module 501, a first determining module 502, a second determining module 503, a sending module 504, a second processing module 505 and a third processing module 601.

A third processing module 601 is specifically used in:

receiving dynamic computing power information and computational process returned by each target node; and adjusting each target node according to the dynamic computing power information and computational process.

The present disclosure provides a computing power server. The computing power server comprises at least one computing power service hardware device, wherein each computing power service hardware device comprises a quantum state microwave control system interface and a digital computing power communication port connection, said computing power service hardware device implements the steps of any one of the above computing power distribution methods; the computing power service hardware device is connected to at least one application node; wherein the quantum state microwave control system interface is used for connecting at least one quantum computer, and the digital computing power communication port is used for connecting at least one electronic computer.

Figure 7:
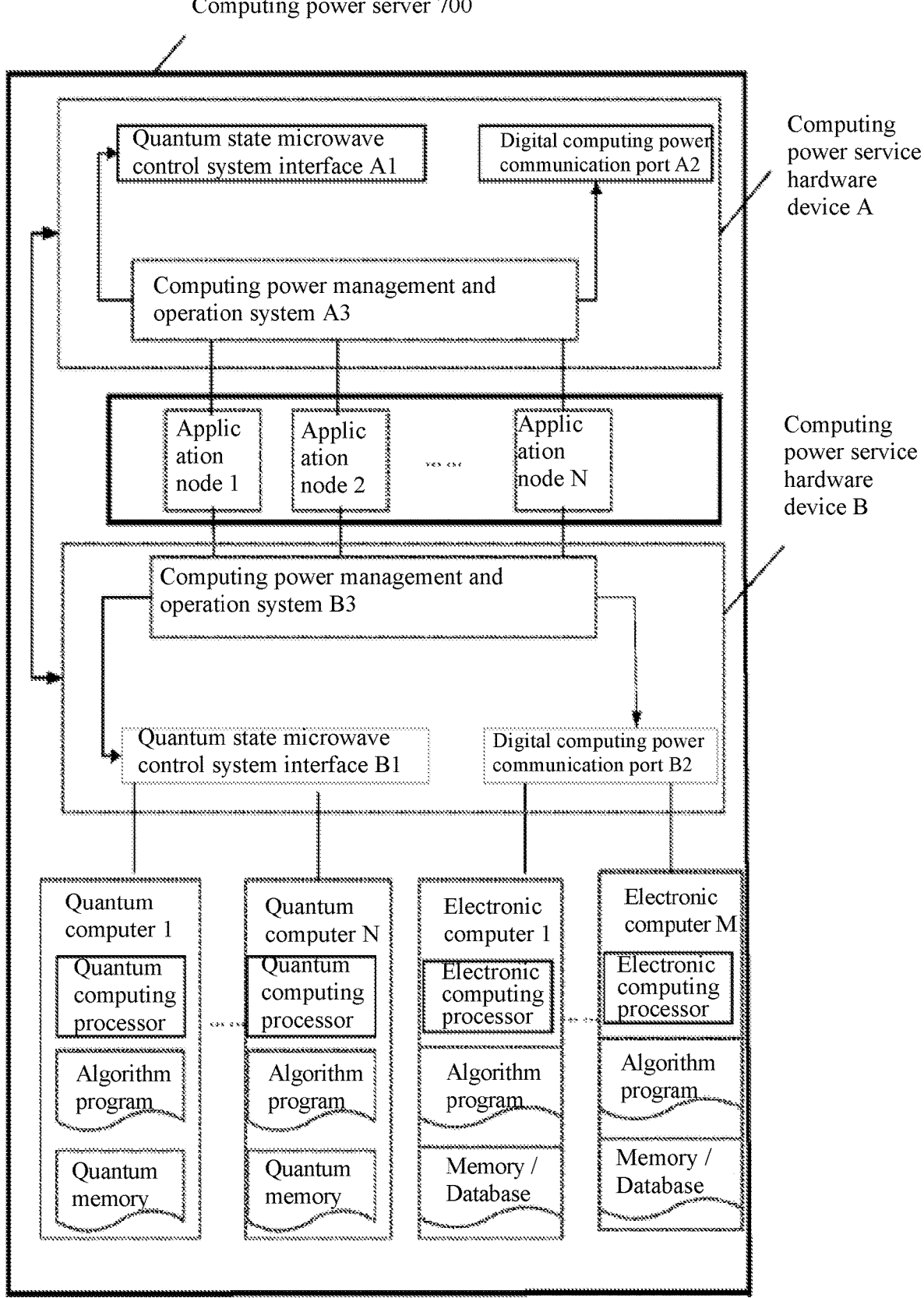
FIG. 7 is a schematic diagram of a system architecture of a computing power server provided by the present disclosure.

The following is an introduction to a computing power server provided by the present disclosure with reference to FIG. 7. FIG. 7 is a schematic diagram of a system architecture of a computing power server provided by the present disclosure.

As shown in FIG. 7, the computing power server 700 includes two computing power service hardware device, namely, computing power service hardware device A and computing power service hardware device B. The computing power service hardware device implements the steps of any one of the above computing power distribution methods via a computing power management and operation system, wherein each computing power service hardware device comprises a quantum state microwave control system interface and a digital computing power communication port. As shown in FIG. 7, a computing power service hardware device A comprises a quantum state microwave control system interface A1 and a digital computing power communication port A2, wherein the computing power service hardware device A implements the steps of any one of the above computing power distribution methods via a computing power management and operation system A3; and a computing power service hardware device B comprises a quantum state microwave control system interface B1 and a digital computing power communication port B2, wherein the computing power service hardware device B implements the steps of any one of the above computing power distribution methods via a computing power management and operation system B3. The computing power service hardware device A and computing power service hardware device B are connected to N application nodes, respectively, which are: application node 1, application node 2, . . . , and application node N. The quantum state microwave control system interface of the computing power service hardware device is used for connecting at least one quantum computer; and the digital computing power communication port is used for connecting at least one electronic computer. Taking the computing power service hardware device B as an example, the computing nodes connected to the quantum state microwave control system interface B1 and the digital computing power communication port B2 will be introduced. As shown in FIG. 7, the quantum state microwave control system interface B1 is connected to N quantum computers, such as quantum computer 1, quantum computer 2, . . . , and quantum computer N. The digital computing power communication port B2 connects M electronic computers, such as electronic computer 1, electronic computer 2, . . . , and electronic computer M.

Figure 8:
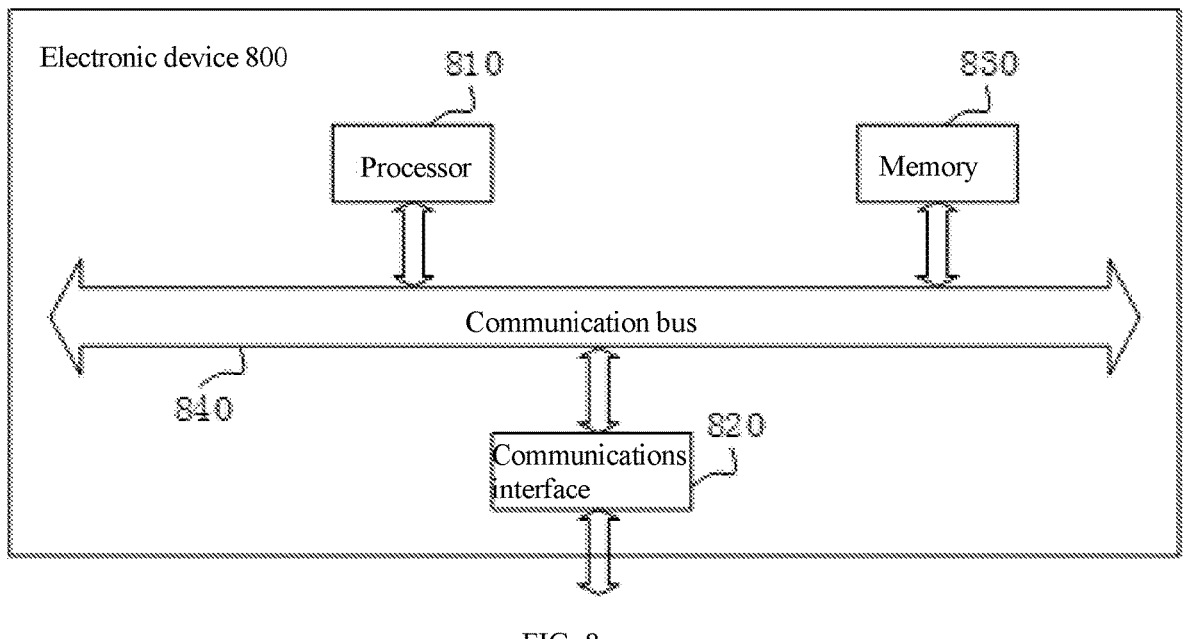
FIG. 8 is a schematic structure diagram of an electronic device provided by the present disclosure.

FIG. 8 is a schematic solid structure diagram of an electronic device provided by the present disclosure. As shown in FIG. 8, the electronic device 800 may include: a processor 810, a communications interface 820, a memory 830, and a communication bus 840, wherein the processor 810, the communications interface 820 and the memory 830 communicate with each other via the communication bus 840. The processor 810 can call logical command in the memory 830 to perform a computing power distribution method, the method comprising:

performing computational problem planning processing on a computational problem sent by application node to obtain at least one sub-computational problem, and a target algorithm type and computing mode corresponding to each sub-computational problem, wherein the target algorithm type comprises a quantum algorithm or a classical algorithm; determining computational problem computing task corresponding to each sub-computational problem according to the target algorithm type and computing mode corresponding to each sub-computational problem; determining at least one target node for each computational problem computing task from each computing node according to computational problem computing task corresponding to each sub-computational problem, dynamic computing power information and a computing power calling relationship of each computing node, sending a computing power control command to each target node, wherein the computing power control command comprises the sub-computational problem, a target algorithm type and computing mode corresponding to the sub-computational problem; and receiving a computing result returned by each target node, and sending the computing result to an application node.

In addition, the logical command in the memory 830 described above may be implemented in the form of software functional units and may be stored in a computer-readable storage medium when sold or used as an independent product. Based on the understanding, the technical solution of the present disclosure, or the part that defines a contribution over the prior art, or part of the technical solution may be embodied in the form of a software product. The computer software product is stored in a storage medium and includes instructions for causing a computer device (which may be a personal computer, a computing server, or a network device, etc.) to perform all or part of the steps of the methods of various embodiments in the present disclosure. The storage medium includes a U disk, a mobile hard disk, a read-only memory (ROM), a random access memory (RAM), a magnetic disk, an optical disk, and other media that can store program codes.

In another aspect, the present disclosure further provides a computer program product, comprising a computer program that can be stored on a non-transitory computer readable storage medium. When the computer program is executed by a processor, the computer is capable of executing the computing power distribution method provided by the above methods. The method comprises: performing computational problem planning processing on a computational problem sent by application node to obtain at least one sub-computational problem, and a target algorithm type and computing mode corresponding to each sub-computational problem, wherein the target algorithm type comprises a quantum algorithm or a classical algorithm; determining computational problem computing task corresponding to each sub-computational problem according to the target algorithm type and computing mode corresponding to each sub-computational problem; determining at least one target node for each computational problem computing task from each computing node according to computational problem computing task corresponding to each sub-computational problem, dynamic computing power information and a computing power calling relationship of each computing node, sending a computing power control command to each target node, wherein the computing power control command comprises the sub-computational problem, a target algorithm type and computing mode corresponding to the sub-computational problem; and receiving a computing result returned by each target node, and sending the computing result to an application node.

In a further aspect, the present disclosure further provides a non-transitory computer readable storage medium having a computer program stored thereon. When the computer program is executed by the processor, the execution of the computing power distribution method provided by the above methods is realized. The method comprises: performing computational problem planning processing on a computational problem sent by application node to obtain at least one sub-computational problem, and a target algorithm type and computing mode corresponding to each sub-computational problem, wherein the target algorithm type comprises a quantum algorithm or a classical algorithm; determining computational problem computing task corresponding to each sub-computational problem according to the target algorithm type and computing mode corresponding to each sub-computational problem; determining at least one target node for each computational problem computing task from each computing node according to computational problem computing task corresponding to each sub-computational problem, dynamic computing power information and a computing power calling relationship of each computing node, sending a computing power control command to each target node, wherein the computing power control command comprises the sub-computational problem, a target algorithm type and computing mode corresponding to the sub-computational problem; and receiving a computing result returned by each target node, and sending the computing result to an application node.

The embodiments of the apparatus described above are intended to be illustrative only, wherein the units illustrated as separate components may or may not be physically separate. The component shown as a unit may or may not be a physical unit, i.e., may be located in one place, or may be distributed across a plurality of network elements. Thus, some or all of the modules can be selected according to actual needs to achieve the purpose of the solution of the embodiments in the present disclosure. Those skilled in the art may understand and practice without creative effort.

As described in the above embodiments, those skilled in the art may clearly understand that each embodiment can be implemented by means of software and necessary general hardware platform, and can also be implemented by hardware. Based on the understanding, the above technical solution, or the part that defines a contribution over the prior art may be embodied in the form of a software product. The computer software product may be stored in a computer readable storage medium, such as ROM/RAM, magnetic disk, optical disk, including several commands to cause a computer device (which may be a personal computer, a server, or a network device, etc.) to perform the methods described in various embodiments or some portions of embodiments.

Finally, it should be noted that the above examples are intended to be illustrative only and not to be limiting of the technical solution of the present disclosure. The present disclosure has been described in detail with reference to the above embodiments, it will be apparent to those of ordinary skill in the art that changes may be made to the technical solutions of the above embodiments or equivalent substitutions may be made to some of the technical features without departing from the spirit and scope of the technical solution of the embodiments of the present disclosure.

What is claimed is:

1. A computing power distribution method applied to a computing power server, wherein the computing power server comprises at least one computing node, and the at least one computing node comprises a quantum computer and/or an electronic computer; the method comprises:

performing computational problem planning processing on a computational problem sent by an application node to obtain at least one sub-computational problem, and a target algorithm type and a computing mode corresponding to each of the at least one sub-computational problem, wherein the target algorithm type comprises a quantum algorithm or a classical algorithm and each of the at least one sub-computational problem is processed by decomposing the received computational problem into a plurality of sub-computational problems using a system model or a computational problem recognition model, and determining the target algorithm type, a computing step and the computing mode;

determining a computational problem computing task corresponding to each of the at least one sub-computational problem according to the target algorithm type and the computing mode corresponding to each of the at least one sub-computational problem;

determining at least one target node for the computational problem computing task from each of the at least one computing node according to the computational problem computing task corresponding to each of the at least one sub-computational problem, a dynamic computing power information and a computing power calling relationship of each of the at least one computing node;

sending a computing power control command to each of the at least one target node, wherein the computing power control command comprises the at least one sub-computational problem, the target algorithm type and the computing mode corresponding to the at least one sub-computational problem; and receiving a computing result returned by each of the at least one target node, and sending the computing result to the application node.

2. The method of claim 1, wherein the performing computational problem planning processing on the computational problem sent by the application node to obtain the at least one sub-computational problem, and the target algorithm type and the computing mode corresponding to of the at least one each sub-computational problem, comprises:

determining the at least one sub-computational problem corresponding to the computational problem, and the target algorithm type and the computing mode corresponding to each of the at least one sub-computational problem according to a historical computational problem configuration data and the computational problem.

3. The method of claim 2, wherein determining the at least one sub-computational problem corresponding to the computational problem, and the target algorithm type and the computing mode corresponding to each of the at least one sub-computational problem according to the historical computational problem configuration data and the computational problem comprises:

determining a computational problem configuration relationship according to the historical computational problem configuration data, wherein the computational problem configuration relationship is used for indicating the at least one sub-computational problem corresponding to the computational problem and the target algorithm type and the computing mode corresponding to each of the at least one sub-computational problem; and determining the at least one sub-computational problem corresponding to the computational problem, and the target algorithm type and the computing mode corresponding to each of the at least one sub-computational problem according to the computational problem configuration relationship and the computational problem.

4. The method of claim 1, wherein determining the at least one target node for the computational problem computing task from each of the at least one computing node according to the computational problem computing task corresponding to each of the at least one sub-computational problem, the dynamic computing power information and the computing power calling relationship of each of the at least one computing node comprises:

determining a computing power quantization index threshold of the computational problem computing task; and determining the at least one target node for the computational problem computing task from each of the at least one computing node according to the computing power quantization index threshold of the computational problem computing task, the dynamic computing power information and the computing power calling relationship of each of the at least one computing node.

5. The method of claim 1, wherein upon sending the computing power control command to each of the at least one target node, the method further comprises:

receiving the dynamic computing power information and a computational process returned by each of the at least one target node; and adjusting each of the at least one target node according to the dynamic computing power information and the computational process.

6. An electronic device comprising a memory, a processor, and a computer program stored in the memory and executed on the processor, wherein when the processor executes the computer program, the steps of the above computing power distribution method of claim 1 are implemented.

\* \* \* \* \*